Sept. 22, 1964   J. KNOWLES   3,149,467
HYDROKINETIC STATOR AND MEANS FOR BRAKING THE SAME
Filed Aug. 7, 1961   2 Sheets-Sheet 2
Fig.3
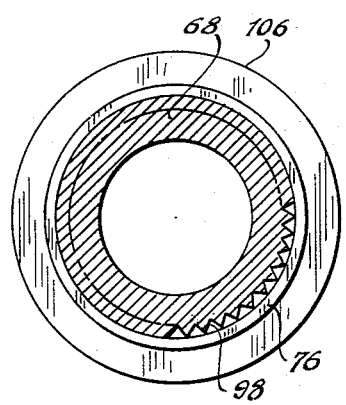
Fig.2
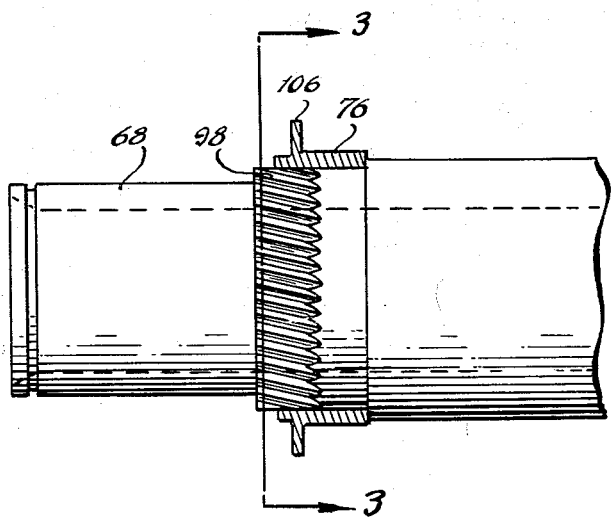
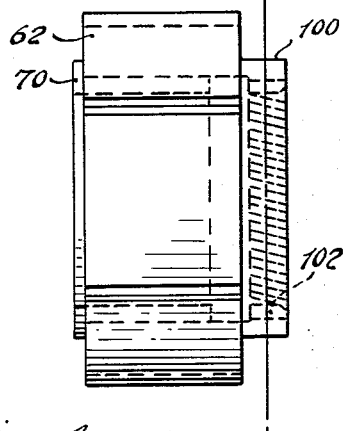
Fig.4
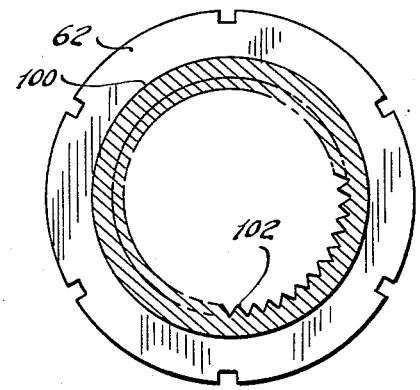
Fig.5
INVENTOR:
JAMES KNOWLES.
BY
ATTORNEYS.

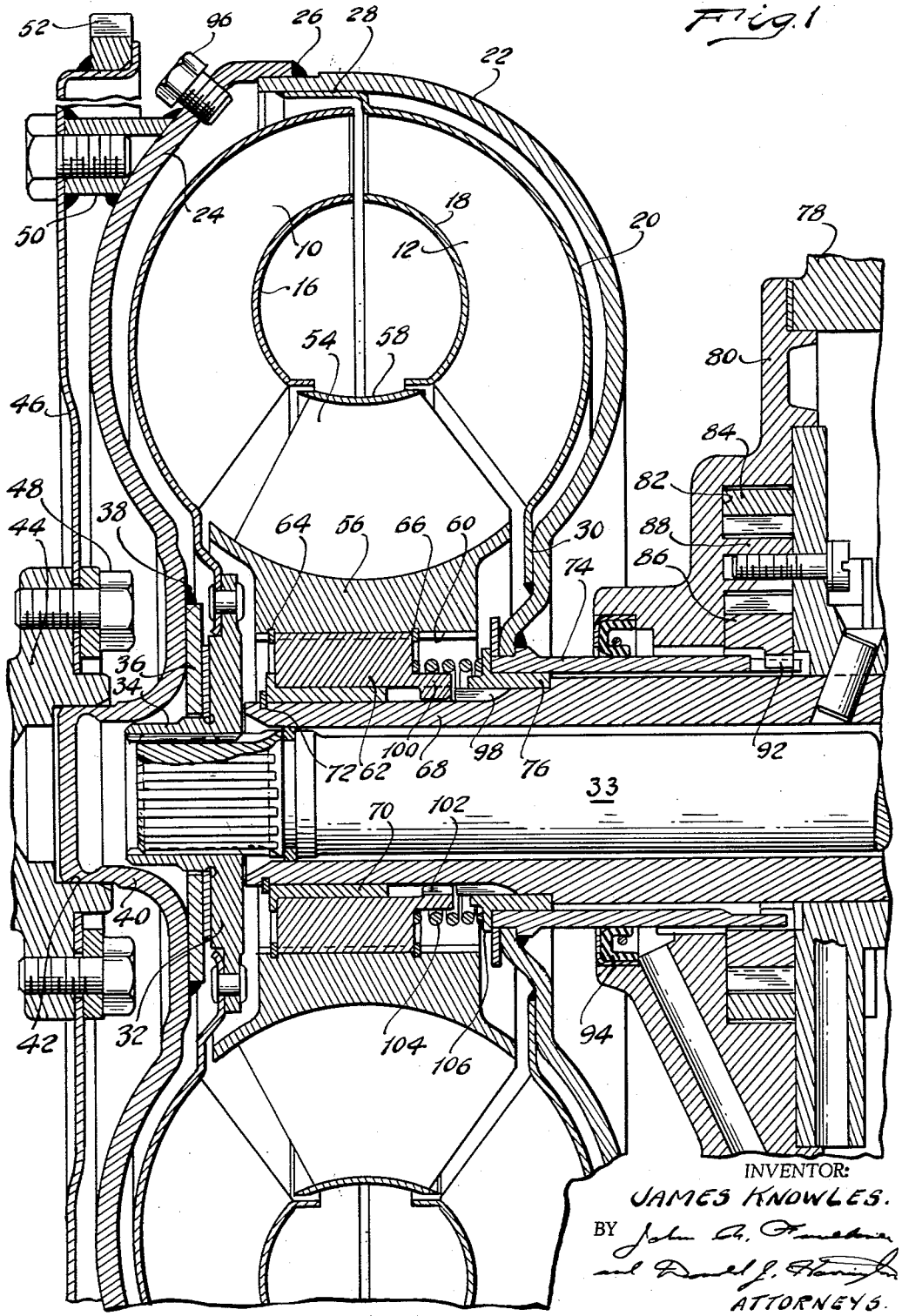

United States Patent Office 3,149,467
Patented Sept. 22, 1964

3,149,467
HYDROKINETIC STATOR AND MEANS FOR
BRAKING THE SAME
James Knowles, Bloomfield Hills, Mich., assignor to Ford
Motor Company, Dearborn, Mich., a corporation of
Delaware
Filed Aug. 7, 1961, Ser. No. 129,862
1 Claim. (Cl. 60—54)

My invention relates generally to hydrokinetic mechanisms, and more particularly to a fluid torque converter having a fluid coupling operating range as well as a torque multiplication operating range.

The improvement of my invention is adapted to be used with torque converters having a stator situated between the inlet section and exit section of cooperating pump and turbine elements respectively. The turbine element normally is provided with blades that define flow passages extending from the radially outward region to a radially inward region, and the pump is provided similarly with blades that define flow passages capable of returning the fluid from a radially inward region to a radially outward region. The stator is situated in the radially inward region. The pump and turbine elements and the cooperating stator define a closed toroidal fluid flow circuit, and when the pump element is rotated with respect to the turbine element, fluid circulation is established in the toroidal fluid flow path.

The fluid flow leaving the exit section of the pump element enters the turbine element at a radially outward region. The turbine blades change the direction of the toroidal fluid flow so that the tangential component of the absolute fluid flow velocity vector decreases. This change in direction of the fluid flow through the turbine element establishes a moment of momentum that is a measure of turbine torque. As the fluid leaves the exit section of the turbine element, its direction is reversed by the stator before it enters the inlet section of the pump element. This produces a torque reaction on the stator that is in a direction opposite to the direction in which the turbine torque is acting. The absolute magnitude of the turbine torque is equal to the sum of the absolute values of the stator torque and the torque applied to the pump element.

In order to accommodate the reverse torque reaction on the stator, it is necessary to provide a suitable stator brake. It is conventional practice to provide an overrunning brake for this purpose, the inner race of which acts upon a relatively stationary sleeve shaft situated concentrically with respect to the stator.

When the speed ratio of the pump and turbine elements is a minimum, the effective torque ratio of the unit is a maximum. For purposes of this description, the term "torque ratio" shall mean the numerical ratio of the turbine torque to the pump torque and the term "speed ratio" shall mean the numerical ratio of the turbine speed to the pump speed. As the turbine element increases in speed, the speed ratio, of course, increases. This is accompanied by a decrease in the effective torque ratio. When the turbine speed approaches the pump speed, the torque reaction acting on the stator becomes zero. During subsequent operation in the so-called coupling range, the direction of the toroidal fluid flow at the radially inward region is such that the stator will tend to rotate in the direction of rotation of the pump and turbine elements.

The overrunning brake is effective to anchor the stator against reverse rotation. It is conventional practice to use an overrunning brake that comprises concentric inner and outer races, one of which is carried by the stator element. Rollers or sprags may be situated between the races for locking the stator against rotation in one direction while accommodating free rotation in the opposite direction.

The improvement of my instant invention comprises an improved overrunning brake capable of controlling the motion of a stator in a hydrokinetic unit of this type. It comprises co-operating brake elements formed on the hub of the stator and on the relatively stationary sleeve shaft upon which the stator is mounted. The brake elements assume an engaged condition under the influence of the axially directed thrust forces acting on the stator during operation. As previously indicated, the torque reaction acting on the stator assumes a maximum value when the speed ratio of the pump and turbine elements is a minimum. This torque reaction creates an axially directed thrust on the stator that is utilized for purposes of engaging the stator brake. As the speed ratio increases, the hydrokinetic force acting on the stator decreases until it assumes a value of zero when the unit begins to operate in the coupling range. When this occurs, the axially directed component of the torque reaction acting on the stator brake is eliminated and the brake thus is caused to assume a freewheeling condition. The use of relatively complex and costly sprag or roller clutch mechanisms is not required.

The provision of a brake mechanism of the type above described being a principal object of my invention, it is another object of my invention to provide a brake mechanism for a torque converter stator that is capable of accommodating freewheeling rotation of the stator during operation of the converter in the coupling range and which will anchor the stator in a relatively stationary position during operation in the converter range. It is a further object of my invention to provide a brake mechanism for a bladed hydrokinetic member that is responsive to the hydrodynamic forces acting on the member.

It is another object of my invention to provide a hydrokinetic unit having a bladed stator member that is capable of limited shifting movement in an axial direction and having a stator braking mechanism that is responsive to the axial shifting movement of the stator member to anchor the stator member when the hydrokinetic forces acting on the same are of a relatively high value, and to accommodate freewheeling motion of the stator member when the hydorkinetic forces are reduced.

Further objects and features of my invention will become apparent from the following description and from the accompanying drawings wherein:

FIGURE 1 shows in cross section a fluid torque converter having a bladed stator that incorporates my improved braking means;

FIGURE 2 is a subassembly view partly in section showing a portion of the stator shaft for mounting the stator of FIGURE 1;

FIGURE 3 is a cross sectional view of the stator shaft taken along section line 3—3 of FIGURE 2;

FIGURE 4 is a subassembly view showing the hub portion of the stator of FIGURE 1;

FIGURE 5 is a cross sectional view of the hub portion of FIGURE 4 and is taken along section line 5—5 of FIGURE 4.

Referring first to FIGURE 1, numeral 10 generally designates a turbine member for a hydrokinetic torque converter, and numeral 12 generally designates the cooperating pump member. Turbine member 10 includes an outer shroud 14 and an inner shroud 16, both of which are semitoroidal in shape. The flow passage defined by the shrouds 14 and 16 accommodate turbine blades that extend from a radially inward region to a radially outward region of the circuit.

A pump inner shroud is shown at 18 and a pump outer shroud is shown at 20.

The converter unit includes a closed shell having two parts identified by reference characters 22 and 24, respectively. The shell parts 22 and 24 are formed with a generally toroidal shape and they are secured at their outer peripheries by weld metal 26. In a similar fashion, the pump member 12 includes blades situated between the shrouds 18 and 20. The geometry of the blades of the pump and turbine members depends upon the performance requirements of the unit.

The radially outward portion of shroud 20 is secured as shown at 28 to the inner surface of the outer periphery of the converter shell. Shroud 20 is secured also to the inner hub portion of the converter shell as shown at 30. By preference, the shroud 20 is secured to the cooperating shell portion by welding.

The inner margin of the shroud 14 is riveted to a hub 32 that is splined to a turbine shaft 33. The splined portion extends axially as shown at 34 and is received within a pilot ring 36 secured by weld metal 38 to the radially inward region of the converter shell portion 24. A pilot 40 is defined by the radially inward region of the shell portion 24 and it extends within a pilot recess 42 in the end of an engine crankshaft 44. A drive plate 46 is secured to th crankshaft 44 by bolts 48. Drive plate 46 in turn is connected to straps 50. These straps form a connection between the shell portion 24 and the radially outward portion of the drive plate 46. A ring gear 52 is carried by the drive plate 46 in the usual fashion. This gear engages a drive pinion powered by a vehicle engine starter motor.

The stator is shown at 54, and it comprises a hub 56 and a surrounding shroud 58. A plurality of stator blades can be formed integrally with the hub 56, and they can be provided with a suitable geometry which will cause a change in the tangential component of the absolute flow velocity vectors leaving the turbine exit section.

The interior of the hub 56 is splined or keyed as shown at 60 to receive an externally splined hub 62 that is held fast by two snap rings 64 and 66. Hub 62 is supported by a relatively stationary stator shaft 68 that extends through the hub 62. A bushing 70 is disposed between shaft 68 and the hub 62 as indicated. A snap ring 72 is received in a cooperating snap ring groove in the sleeve shaft 68 to position the bushing 70.

The shell portion 22 is welded to a sleeve shaft 74 that is situated concentrically with respect to stator shaft 68. Another bushing 76 is situated between shaft 68 and shaft 74 to provide support for the converter shell.

A portion of the transmission housing is shown at 78, and it has secured thereto a pump housing 80 having a cavity 82 within which is situated a pair of pumping elements shown at 84 and 86. In the embodiment shown, the elements 84 and 86 are in the form of internal and external gears that are positioned eccentrically with respect to each other, although they are disposed in driving engagement. A pump crescent 88 is situated between the internal and external gears as indicated. The external gear 86 is keyed at 90 to one end of the sleeve shaft 74 so that the pump mechanism defined by elements 84 and 86 is driven by the rotary shell for the converter unit.

The pump housing 80 encircles sleeve shaft 74, and a fluid seal 94 is disposed between the shaft 84 and the surrounding pump housing. The shell for the converter unit is filled with oil during operation. Internal passage structure can be used to supply the interior of the converter shell with fluid made available by the pump structure 84 and 86. Other passage structure can be used for returning the converter oil to an oil cooler if this is desired. A drain plug 96 can be provided in the converter shell to provide a means for draining the interior of the shell.

The stationary sleeve shaft 68 is formed with splined teeth 98 at one end of a reduced diameter portion upon which the hub 62 is mounted. An extension 100 is formed on the hub 62, and it carries internally splined teeth 102 located directly adjacent the teeth 98. The teeth 102 and the teeth 98 are formed with a helix angle as indicated in FIGURES 2 and 4.

As best seen in FIGURE 1, a compression spring 104 is disposed between the bushing 76 and the adjacent end of a hub 62. The bushing 76 is formed with a radial spring seat 106 for the purpose of providing a seat for the spring 104.

The spring 104 normally urges hub 62 in a left-hand direction as viewed in FIGURE 1, thus maintaining the teeth 102 out of mating engagement with teeth 98. When in this condition, stator 54 is free to rotate in either direction upon the bushing 70. The stator 54 is capable of shifting axially in a right-hand direction, however, and when this occurs teeth 102 engage teeth 98, thus locking stator 54 to the stationary stator shaft 68. Relative motion of the stator 54 thus is inhibited.

During initial acceleration, the toroidal fluid flow increases to its maximum value. This flow and the angularity of the stator blades will create an axial shifting movement of the stator 54 in a right-hand direction as viewed in FIGURE 1. This causes the teeth 102 to engage stationary teeth 98. The teeth 98 and 102 are formed with helical angles as previously explained, and the tangential component of the forces acting on the stator under these conditions tends to cause a so-called threading action between the hub 62 and the sleeve 68. This threading action augments the engaging force that is due to the axially directed thrust component acting on the stator 54.

When the torque converter reaches the coupling range, the axially directed forces acting on the stator 54 decrease. Under these conditions the force of the spring 104 will be sufficient to return the stator 54 to the position shown in FIGURE 1. Freewheeling motion of the stator 54 will be permitted and the amount of drag acting on the stator is minimized. The coupling characteristics of the unit are improved accordingly.

As previously indicated, the degree of thrust acting on the stator is determined by the amount of slip between the pump and turbine elements. In one operating embodiment of my invention, the axial thrust at zero speed ratio is approximately 64 pounds. This thrust decreases to approximately 18 pounds when the speed ratio increases to .9. These figures were obtained during full throttle operation with an engine having a torque rating of 180 lb.-ft.

The spring 104 prevents ratcheting of the teeth 98 and 102 during freewheeling operation. The magnitude of the spring load should be some value less than 18 pounds in an embodiment of this type.

Having thus described a preferred form of my invention, what I claim and desire to secure by U.S. Letters Patent is:

In a hydrokinetic torque converter mechanism having a bladed impeller, a bladed turbine and a bladed stator situated in fluid flow relationship in a closed toroidal circuit, said stator being disposed between the flow exit section of said turbine and the flow inlet section of said impeller, a stationary stator shaft, a turbine shaft connected to said turbine, said stator including a hub surrounding said stator shaft, bearing means for rotatably journaling said hub on said stator shaft and for accommodating axial shifting movement of said stator with respect to said stator shaft, brake means for locking said stator hub to said stator shaft including first brake elements carried by said stator shaft and cooperating second brake elements carried by said hub, said brake elements being engageable to lock said stator upon shifting movement of said stator in one direction under the influence of hydrodynamic thrust forces acting upon bladed portions thereof, and spring means for normally biasing said hub in the opposite direction to disengage said brake elements and to permit freewheeling rotation of said stator as the thrust forces approach zero during coupling operation of said converter mechanism.

References Cited in the file of this patent
UNITED STATES PATENTS

| | | |
|---|---|---|
| 2,034,429 | De Lavaud | Mar. 17, 1936 |
| 2,611,452 | Lapsley | Sept. 23, 1952 |